United States Patent
Langhammer

(10) Patent No.: US 8,645,712 B1
(45) Date of Patent: Feb. 4, 2014

(54) ELECTRONIC CIRCUIT DESIGN COPY PROTECTION

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 1365 days.

(21) Appl. No.: 11/261,155

(22) Filed: Oct. 27, 2005

(51) Int. Cl.
*H04L 9/14* (2006.01)

(52) U.S. Cl.
USPC .............. 713/189; 713/193; 713/194; 716/16

(58) Field of Classification Search
USPC .............................. 713/189, 193–194; 716/16
See application file for complete search history.

(56) References Cited

U.S. PATENT DOCUMENTS

| | | | | |
|---|---|---|---|---|
| 5,278,905 A * | 1/1994 | McNair | | 380/44 |
| 5,982,899 A * | 11/1999 | Probst | | 713/1 |
| 6,212,639 B1 * | 4/2001 | Erickson et al. | | 726/26 |
| 6,708,273 B1 * | 3/2004 | Ober et al. | | 713/189 |
| 6,904,527 B1 * | 6/2005 | Parlour et al. | | 713/189 |
| 7,484,104 B2 * | 1/2009 | Masui et al. | | 713/189 |
| 7,519,823 B1 * | 4/2009 | Schumacher et al. | | 713/176 |
| 7,592,829 B2 * | 9/2009 | Walmsley et al. | | 326/8 |
| 7,702,927 B2 * | 4/2010 | Devadas et al. | | 713/194 |
| 2001/0015919 A1 * | 8/2001 | Kean | | 365/200 |
| 2002/0199110 A1 * | 12/2002 | Kean | | 713/189 |
| 2005/0180572 A1 * | 8/2005 | Graunke | | 380/277 |
| 2005/0289355 A1 * | 12/2005 | Kitariev et al. | | 713/182 |
| 2006/0059345 A1 * | 3/2006 | Fayad et al. | | 713/173 |
| 2007/0039060 A1 * | 2/2007 | Jamieson et al. | | 726/34 |
| 2008/0270805 A1 * | 10/2008 | Kean | | 713/189 |

OTHER PUBLICATIONS

Carts, David A.; "A Review of the Diffie-Hellman Algorithm and its use in secure internet protocols"; 2001 *SANS Institute*, pp. 1-7.
Koushanfar et al.; "Intellectual Property Metering"; 2001, *Information Hiding, 4th International Workshop*, pp. 81-95.
"SiidTech Inc.—Silicon Fingerprinting™—Every Chip Unique"; http://www.siidtech.com/pages/650798/index.htm, 4 pages.
"Building Ids into Chips"; 2003, *Semiconductor Innovation Letter*, pp. 1,7 and 8.

* cited by examiner

*Primary Examiner* — Yin-Chen Shaw
(74) *Attorney, Agent, or Firm* — Ropes & Gray LLP

(57) ABSTRACT

An electronic device takes the form of a programmable logic device, including logic resources whose functions and interconnections are dependent on the configuration information applied to the device. Each such electronic device is provided with a unique identifier. In order to implement a design of an electronic circuit on an electronic device, the configuration information that is required to cause the device to perform its desired function is encrypted before being applied to the device, and is decrypted on the device itself. The encryption process, and hence the required decryption, are based on the identifier, and hence are effectively unique to the particular device, so that the intended design can be implemented only by means of configuration information that is related to the unique identifier, and the configuration information cannot be applied to other devices to make unauthorized configured devices.

19 Claims, 5 Drawing Sheets

ELECTRONIC CIRCUIT DESIGN COPY PROTECTION

TECHNICAL FIELD OF THE INVENTION

This invention relates to a method for protection of the design of an electronic circuit, and to an electronic device that can be protected in this way.

BACKGROUND OF THE INVENTION

For many manufacturers of electronic circuit products, the security of their design is a major concern. The design of an electronic circuit product is potentially time-consuming and expensive, and yet the information about the design is potentially vulnerable to interception by unauthorized third parties, who can use that information to make unauthorized copies of products.

This is a particular concern where the manufacture of the product is carried out by a different company from the company that owns the design. In such situations, the company owning the design has a particular vulnerability to the interception of the design information.

SUMMARY OF THE INVENTION

According to a first aspect of the present invention, there is provided a method of implementing a design of an electronic circuit on an electronic device, in which each electronic device is provided with a unique identifier, and the intended design can be implemented only by means of configuration information that is related to the unique identifier.

In an embodiment of the invention, the electronic device takes the form of a programmable logic device, including logic resources whose functions and interconnections are dependent on the configuration information applied to the device. The configuration information that is required to cause the device to perform its desired function is then encrypted before being applied to the device, and is decrypted on the device itself. The encryption process, and hence the required decryption, are based on the identifier, and hence are effectively unique to the particular device, so that the configuration information cannot be applied to other devices to make unauthorized configured devices.

According to a second aspect of the present invention, there is provided an electronic device, in which a design can be implemented by means of configuration information, wherein the electronic device contains an identifier, and wherein the design can only be implemented in a specific electronic device by means of configuration information that is related to the identifier of that specific electronic device.

DETAILED DESCRIPTION OF PREFERRED EMBODIMENTS

Figure 1:
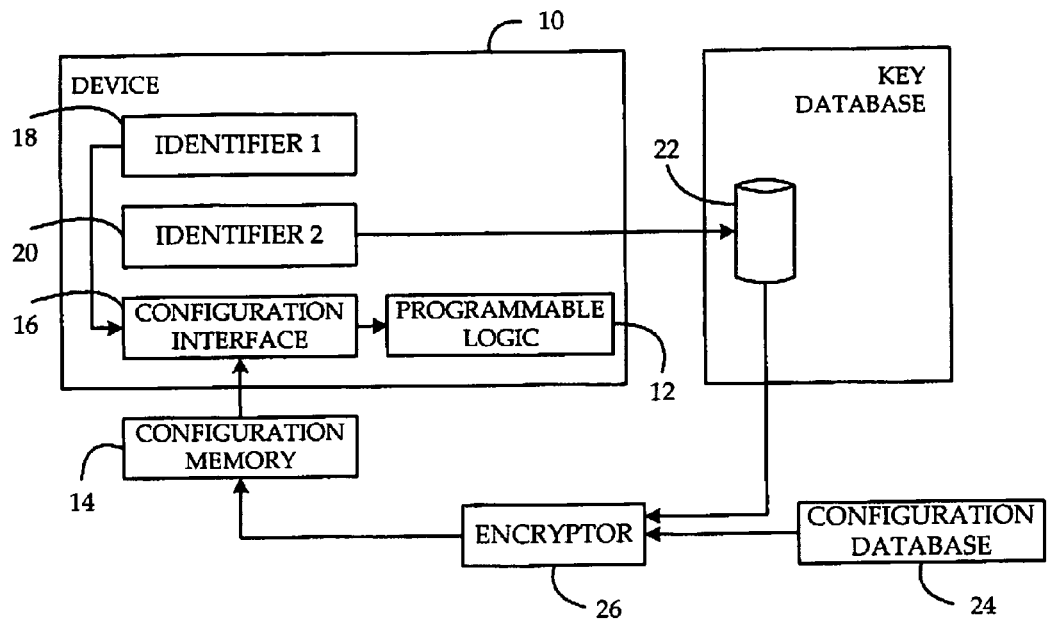
FIG. 1 is a block schematic diagram of a first system in accordance with the invention.

FIG. 1 is a block schematic diagram, illustrating a system in accordance with the present invention. An electronic device 10, in this preferred embodiment of the invention, is a Field Programmable Gate Array, containing programmable logic 12. That is, the programmable logic 12 may for example contain logic resources, and the functions and interconnections of these can be programmed by applying appropriate configuration data.

As shown in FIG. 1, the configuration data can be stored in a configuration memory 14, for example a flash memory device, that is associated with the device 10. The device 10 includes a configuration interface 16, which is connected to the configuration memory 14 to receive the configuration data and pass it to the programmable logic 12.

In this embodiment of the invention, the device 10 also contains two identifiers, namely a first identifier 18 and a second identifier 20. In one embodiment of the invention, these identifiers are generated as part of the manufacturing process of the device 10. Alternatively, they may be hard-wired into the device 10.

In one embodiment of the invention, the first identifier 18 can be read out of the device 10 only by a wafer probing technique. In another embodiment of the invention, the first identifier 18 can be read out of the device 10 only by means of a path that is destroyed, for example by blowing a fuse, as soon as that path is first used.

The second identifier 20, by contrast, can be read out by means of the JTAG interface of the device 10, or through dedicated pins on the device 10.

The first identifier 18 therefore acts as a secret key, while the second identifier 20 acts as a serial number for the device.

As is well known, electronic devices such as the device 10 are often incorporated into larger electronic products, and this process may take place outside the control of the owner of the design of the product. There is therefore a fear that, if an unauthorized third party gains possession of the configuration data that is to be used to implement a part of that design in the device 10, then that unauthorized party may be able to make unauthorized copies of the design.

In accordance with the invention, a key database 22 is maintained. This contains details of the secret key associated with the serial number for each of the devices 10 that have been manufactured.

At the same time, the owner of the design maintains a configuration database 24, containing the configuration data required to implement a desired design in the electronic devices 10, and this is connected to an encryptor 26, data from which can be transferred to the configuration memory 14 of each of the devices 10 in turn.

Figure 2:
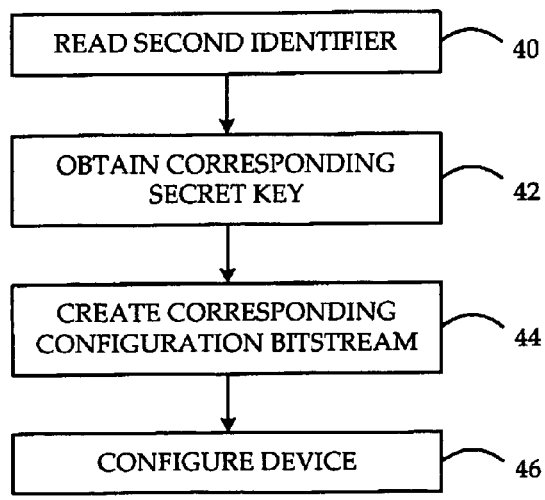
FIG. 2 is a flow chart, illustrating a method of operation of the system of FIG. 1, in accordance with the invention.

The operation of the system shown in FIG. 1 will now be described with reference to FIG. 2.

In step 40 of the process, the second identifier 20, or serial number, is read out of the device 10, and is transferred to the key database 22. The first identifier 18, or secret key, corresponding to that serial number, is then read out of the key database 22 in step 42 of the process.

The owner of the design maintains a database 24, containing the configuration data required to implement a particular design on each of the devices 10 that it owns. In step 44 of the process, that configuration data is passed from the configuration database 24 to the encryptor 26, together with the secret key for a particular one of those devices. The encryptor 26 then combines the configuration data and the secret key, according to an encryption algorithm of a type that is well known to the person skilled in the art, to form an encrypted configuration data bitstream.

In step 46 of the process, the encrypted configuration data bitstream is passed to the configuration memory 14, and then to the configuration interface 16 of the device 10. In this embodiment of the invention, the configuration interface 16 is able to use the secret key, or first identifier 18, to decrypt the encrypted configuration data bitstream received from the encryptor 26, and thereby recreate the configuration data in a form that can be passed to the programmable logic 12 to cause the required design to be implemented. However, this will only succeed if the encrypted configuration data bitstream has been encrypted with the secret key for that specific device.

Thus, the device 10 can only be programmed with a particular design if it receives as an input the configuration data for that design, encrypted with the secret key for that specific device. In one implementation of the invention, the key database 22 may be maintained by the manufacturer of the devices 10, and steps can be taken to ensure that only a legitimate purchaser of the device 10 is able to retrieve the necessary secret key from the key database 22. This means that the devices 10 are only able to be used by their legitimate purchasers, thereby providing increased security.

In another implementation of the invention, a legitimate purchaser of the device 10 may require the device to form part of a product that is to be manufactured in a facility that is not under that purchaser's direct control. In that case, the product can be manufactured, incorporating the unconfigured device 10. Then, the serial number, or second identifier 20, can be read out from the device 10, as described above, and sent to the key database 22 maintained by the manufacturer of the devices 10. For example, the serial number could be sent automatically to a website maintained by the manufacturer of the devices 10. The required secret key can then be passed to the purchaser of the device 10 for generation of the encrypted configuration data bitstream, and this can then be transferred to the manufacturer of the product, in order to allow the device 10 to be configured as required. Because the manufacturer of the product never receives the unencrypted configuration data, it is not able to configure further devices. Provided that the legitimate purchaser of the devices 10 receives all of its devices, it can be assured that further devices incorporating its design have not been produced, thereby providing it with a high degree of security.

Preferably, the first and second identifiers 18, 20 are unique to a specific device 10. However, all that is required is that they should be sufficiently unusual that the probability of generating a pair of identifiers by chance is acceptably low.

Figure 3:
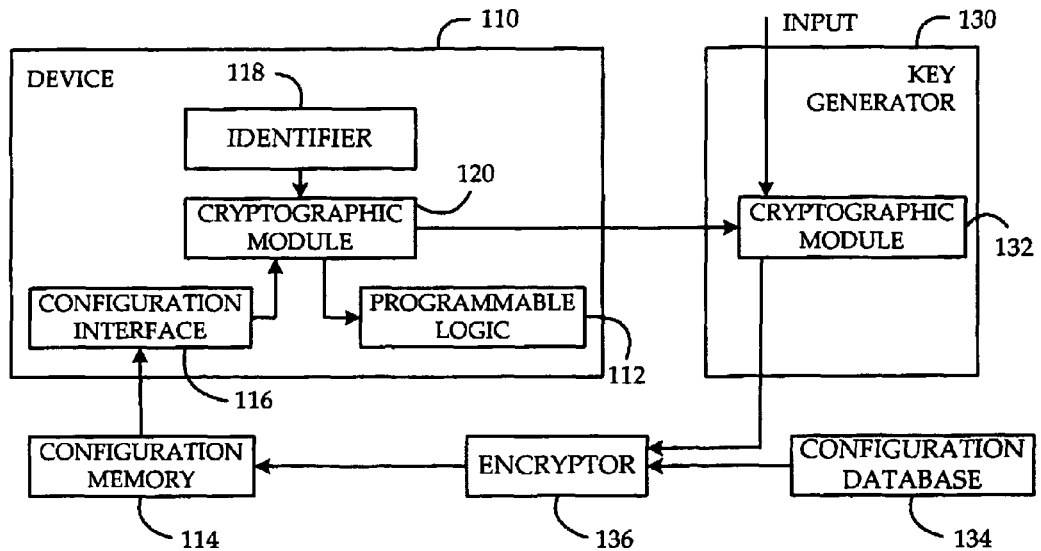
FIG. 3 is a block schematic diagram of a second system in accordance with the invention.

FIG. 3 is a block schematic diagram, illustrating a system in accordance with the present invention. An electronic device 110, in this preferred embodiment of the invention, is a Field Programmable Gate Array, containing programmable logic 112. That is, the programmable logic 112 may for example contain logic resources, and the functions and interconnections of these can be programmed by applying appropriate configuration data.

As shown in FIG. 3, the configuration data can be stored in a configuration memory 114, for example a flash memory device, that is associated with the device 110. The device 110 includes a configuration interface 116, that is connected to the configuration memory 114 to receive the configuration data and pass it to the programmable logic 112.

In this embodiment of the invention, the device 110 is programmed with an identifier 118, which is preferably unique to the device 110, but in practice only needs to be sufficiently unusual that the probability of generating a suitable identifier by chance is acceptably low. In one embodiment of the invention, the identifier is generated as part of the manufacturing process of the device 110. Alternatively, it may be hardwired into the device 110. However, the identifier 118 cannot be read out of the device 110.

The device 110 further includes a cryptographic module 120, which may be of a type generally known to the person skilled in the art, and capable of performing various cryptographic functions, as described in more detail below.

Separately from the device 110, a key generator server 130 containing a second cryptographic module 132 is maintained. As with the first cryptographic module 120, this may be of a type generally known to the person skilled in the art, and capable of performing various cryptographic functions, as described in more detail below.

At the same time, the owner of the design maintains a configuration database 134, containing the configuration data required to implement a desired design in the electronic devices 110, and this is connected to an encryptor 136, data from which can be transferred to the configuration memory 114 of each of the devices 110 in turn. For example, the key generator 130, configuration database 134 and encryptor 136 may all be maintained by the owner of the devices 110, and of the design to be implemented on those devices, on a server to which the cryptographic modules of the devices 110 can be connected in turn.

Figure 4:
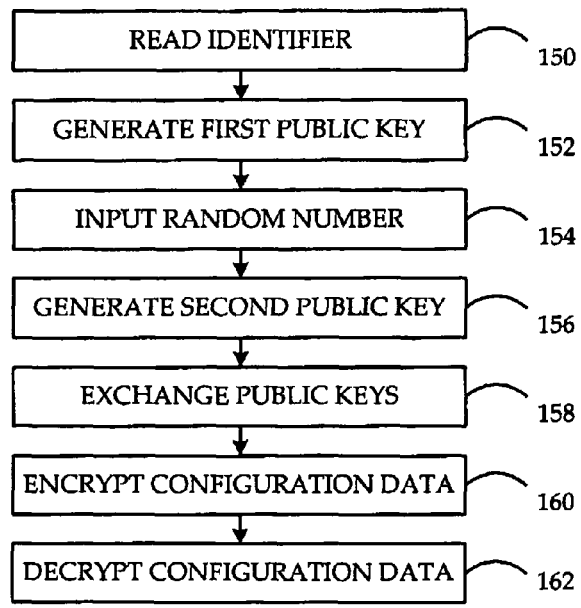
FIG. 4 is a flow chart, illustrating a method of operation of the system of FIG. 3, in accordance with the invention.

FIG. 4 illustrates the operation of the invention. In step 150, when it is desired to implement a design in one of the devices 110, the identifier 118 is read into the cryptographic module 120, and a public number, also referred to as a public key, is generated in step 152. For example, using one previously described process using a carefully chosen value for n, and a particular value for g, and defining the effectively random identifier 118 as x, a public key X can be generated as $X=g^x$ mod n. As is understood, the values of n and g do not have to be secret, and can for example be used for many different devices 110 or indeed families of devices.

The value of this public key X can then be read out of the device 110 when required, even though the value of x is, as described above, not accessible externally, and moreover cannot be determined from a knowledge of X.

In step 154, a random number y is read into the cryptographic module 132 of the key generator 130. In step 156, a corresponding public number, or public key, Y is generated. As above, the public key Y can be generated as $Y=g^y$ mod n. The same values are used for n and g as in the cryptographic module 120 of the device 110.

In step 158 of the process, with their cryptographic modules 120, 132 connected, the device 110 and the key generator 130 exchange their respective public keys X, Y.

Since the cryptographic module 120 of the device 110 now knows X, Y and x, it can calculate a decryption key $X^*=Y^x$ mod n. Similarly, since the cryptographic module 132 of the key generator 130 now knows X, Y and y, it can calculate an encryption key $Y^*=X^y$ mod n. Moreover, since $X=g^x$ mod n and $Y=gY$ mod n, it can be seen that $X^*=Y^*$.

The public key is not used for encryption, but it is a number that can be used to generate a secret key, in this case $X^*$ or $Y^*$. This method of generating secret keys from public keys, or public numbers, is closely based on the well-known Diffie-Hellman algorithm. Other known key exchange algorithms can equally be used in the system of the invention.

The encryption and decryption operations are not performed by key exchange algorithm. The secret keys that are generated on either end are used in an encryption algorithm that is separate from the key exchange algorithm.

Thus, in step 160 of the process, the encryption key Y* is used by the encryptor 136 to encrypt the configuration data, and this is passed to the device 110.

In step 162 of the process, the received encrypted data is decrypted using the decryption key X*. Since X*=Y*, the decrypted data is the original configuration data, and can be used to configure the programmable logic 112 of the device 110 as required.

In this process, the decryption key is calculated in the device 110, and stored for possible future use whenever the device is configured.

Figure 5:
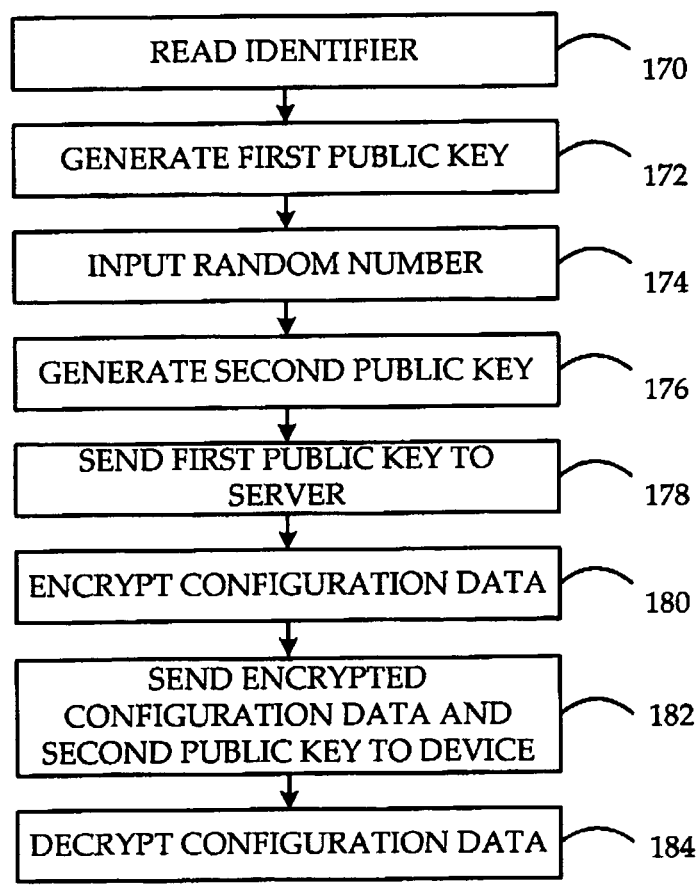
FIG. 5 is a flow chart, illustrating an alternative method of operation of the system of FIG. 3, in accordance with the invention.

An alternative to this sequence is shown in FIG. 5. Steps 170, 172, 174 and 176 of the process shown in FIG. 5 correspond to steps 150, 152, 154 and 156 of the process shown in FIG. 4, but there is no exchange of public keys before the configuration data is encrypted. Rather, in step 178, the public key X of the device 110 is sent to the cryptographic module 132 of the key generator server 130. Since this now knows X, Y and y, it can calculate an encryption key $Y^*=X^y$ mod n. The configuration data is encrypted with this encryption key Y* at step 180, and the encrypted configuration data can be passed to the device 110 together with the public key Y of the key generator 130 at step 182.

Since the cryptographic module 120 of the device 110 now knows X, Y and x, it can calculate the decryption key $X^*=Y^x$ mod n, and can use this in step 184 to decrypt the received encrypted configuration data, since X*=Y* as before.

In this process, the need to store the decryption key for future use is avoided, but it is necessary to calculate the decryption key each time the device is configured.

Thus, in the system of FIG. 3, although a third party might know any or all of the values of n and g, and the values of the public keys X and Y, and might be able to gain access to the encrypted configuration data, that third party would not be able to gain access to the original configuration data without knowledge of x or y, and would not be able to use the encrypted configuration data to configure any device other than that having the appropriate identifier x.

As a further security feature, a second identifier can be programmed into the device 110. Again, this is preferably unique to the device 110, but in practice only needs to be sufficiently unusual that the probability of generating a suitable identifier by chance is acceptably low. It may be generated as part of the manufacturing process of the device 110, or it may be hardwired into the device 110. This second identifier serves as a serial number of the device 110, and the operator of the key generator 130, who may be the owner of the device 110, maintains a list of the serial numbers of the devices that he owns. The method of FIG. 4 or FIG. 5 can then be modified to require that the serial number of the device 110 be sent in conjunction with the key exchanges. In that case, if a non-existent serial number, or a previously used serial number, is sent to the key generator 130, it can be determined that the request may be unauthorized.

Figure 6:
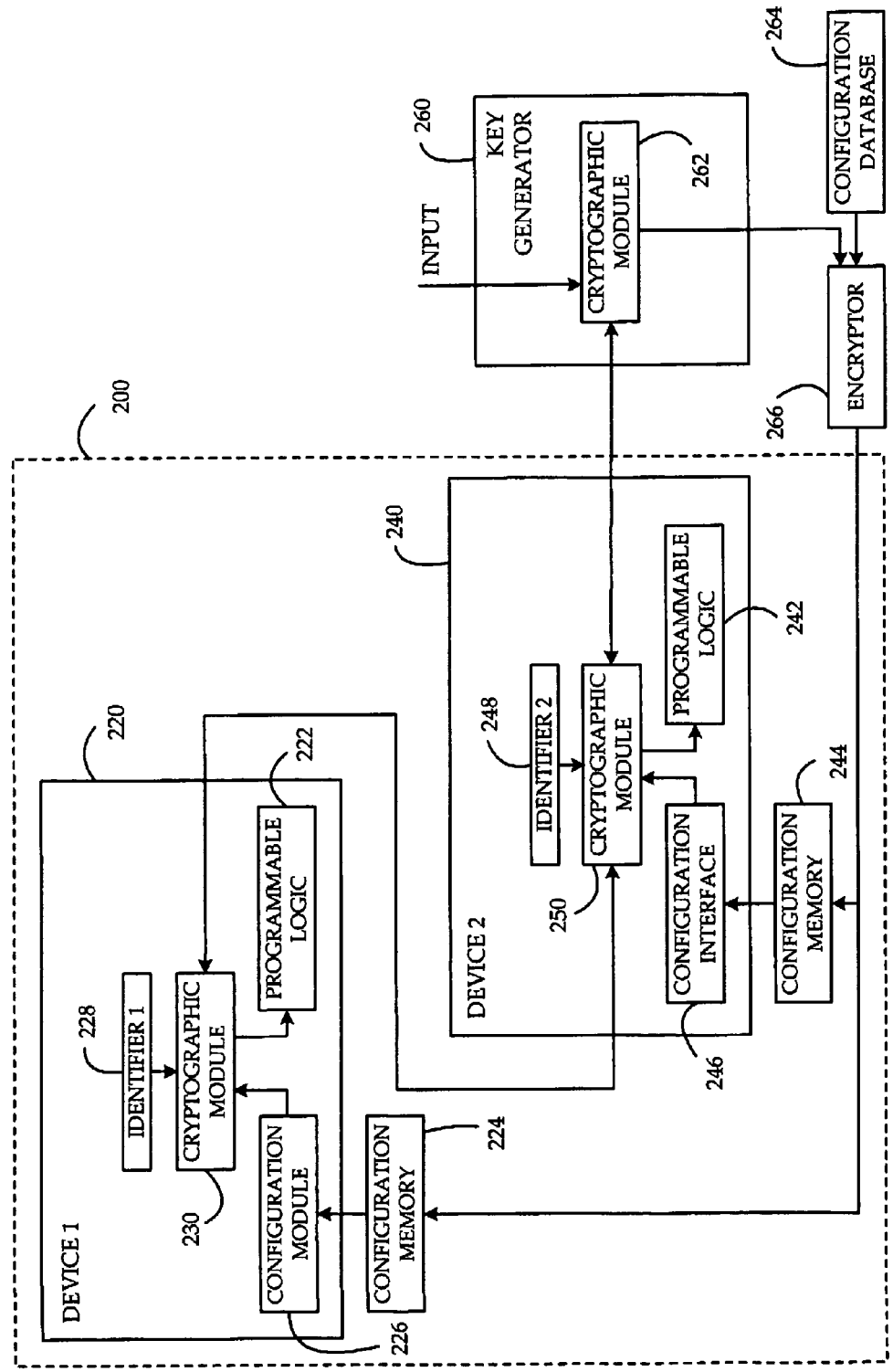
FIG. 6 is a block schematic diagram of a third system in accordance with the invention.
Figure 7:
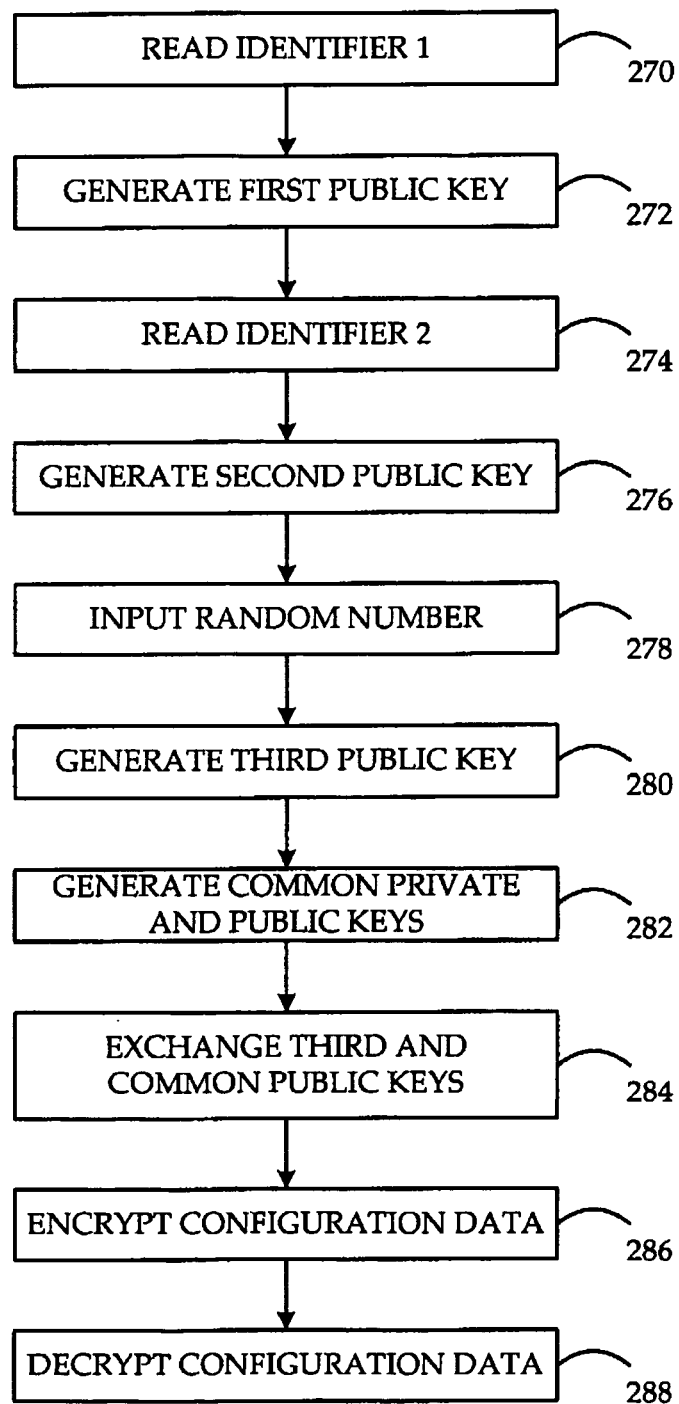
FIG. 7 is a flow chart, illustrating a method of operation of the system of FIG. 6, in accordance with the invention.

FIGS. 3 and 4, or FIGS. 3 and 5, therefore illustrate a system that can be used to protect a particular design, which is to be implemented in a specific device. Commonly, however, a design of a complex product has to be implemented in more than one such device. FIGS. 6 and 7 illustrate a system that can be used in such a situation.

FIG. 6 is a block schematic diagram, illustrating a system in accordance with the present invention. FIG. 6 illustrates a system in which a complex product 200 includes a first electronic device 220 and a second electronic device 240, although it will be apparent that the invention is equally applicable to products including more than two devices. For example, the first electronic device 220 and the second electronic device 240 may be located on the same circuit board. In this preferred embodiment of the invention, the first electronic device 220 and the second electronic device 240 are each Field Programmable Gate Arrays.

Specifically, the first electronic device 220 contains programmable logic 222. That is, the programmable logic 222 may for example contain logic resources, and the functions and interconnections of these can be programmed by applying appropriate configuration data.

As shown in FIG. 6, the configuration data can be stored in a configuration memory 224, for example a flash memory device, that is associated with the device 220. The device 220 includes a configuration interface 226, that is connected to the configuration memory 224 to receive the configuration data and pass it to the programmable logic 222.

In this embodiment of the invention, the device 220 is programmed with a first identifier 228, which is preferably unique to the device 220, but in practice only needs to be sufficiently unusual that the probability of generating a suitable identifier by chance is acceptably low. In one embodiment of the invention, the identifier is generated as part of the manufacturing process of the device 220. Alternatively, it may be hardwired into the device 220. However, the identifier 228 cannot be read out of the device 220.

The device 220 further includes a cryptographic module 230, which may be of a type generally known to the person skilled in the art, and capable of performing various cryptographic functions, as described in more detail below.

Similarly, the second electronic device 240 contains programmable logic 242. That is, the programmable logic 242 may for example contain logic resources, and the functions and interconnections of these can be programmed by applying appropriate configuration data.

As shown in FIG. 6, the configuration data can be stored in a configuration memory 244, for example a flash memory device, that is associated with the device 240. The device 240 includes a configuration interface 246, that is connected to the configuration memory 244 to receive the configuration data and pass it to the programmable logic 242.

In this embodiment of the invention, the device 240 is programmed with a second identifier 248, which is preferably unique to the device 240, but in practice only needs to be sufficiently unusual that the probability of generating a suitable identifier by chance is acceptably low. In one embodiment of the invention, the identifier is generated as part of the manufacturing process of the device 240. Alternatively, it may be hardwired into the device 240. However, the identifier 248 cannot be read out of the device 240.

The device 240 further includes a second cryptographic module 250, which may be of a type generally known to the person skilled in the art, and capable of performing various cryptographic functions, as described in more detail below.

Separately from the product 200, a key generator server 260 containing a third cryptographic module 262 is maintained. As with the first and second cryptographic modules 230, 250, this may be of a type generally known to the person skilled in the art, and capable of performing various cryptographic functions, as described in more detail below.

At the same time, the owner of the design maintains a configuration database 264, containing the configuration data required to implement a desired design in the products incorporating the pairs of electronic devices 220, 240, and this is connected to an encryptor 266, data from which can be transferred to the configuration memories 224, 244 of each of the products 200 in turn. For example, the key generator 260, configuration database 264 and encryptor 266 may all be maintained by the owner of the devices 220, 240 and of the design to be implemented on the products 200 incorporating those devices, on a server to which the cryptographic modules 230, 250 of the devices can be connected in turn.

FIG. 7 illustrates the operation of the invention. In step 270, when it is desired to implement a design in one of the products 200, the first identifier 228 is read into the cryptographic module 230 of the first device 220, and a first public number, or public key, is generated in step 272. For example, using one previously described process using a carefully chosen value for n, and a particular value for g, and defining the effectively random identifier 228 as w, a first public key W can be generated as $W=g^w$ mod n. As is understood, the values of n and g do not have to be secret, and can for example be used for many different devices 220 or indeed families of devices.

The value of this public key W can then be read out of the device 220 when required, even though the value of w is, as described above, not accessible externally, and moreover cannot be determined from a knowledge of W.

In step 274, the second identifier 248 is read into the cryptographic module 250 of the second device 240, and a second public number, or public key, is generated in step 276. As above, defining the second identifier 248 as x, a second public key X can be generated as $X=g^x$ mod n. It will be understood that steps 274 and 276 use the same values of n and g as steps 270 and 272.

The value of this second public key X can then be read out of the device 240 when required, even though the value of x is, as described above, not accessible externally, and moreover cannot be determined from a knowledge of X.

In step 278, a random number y is read into the cryptographic module 262 of the key generator 260. In step 280, a corresponding public number, or public key, Y is generated. As above, the public key Y can be generated as $Y=g^y$ mod n. The same values are used for n and g as in the cryptographic modules 230, 250 of the devices 220, 240.

In step 282 of the process, with their cryptographic modules 230, 250 connected, the first and second devices 220, 240 exchange their respective public keys W, X to generate a common public key, Z, and this is stored in the cryptographic modules 230, 250 of the two devices 220, 240.

In step 284 of the process, the cryptographic module 262 of the key generator 260 is connected to the cryptographic module of one of the devices, in this illustrated case the cryptographic module 250 of the second device 240, and the cryptographic modules 262, 250 exchange the respective public keys Y, Z.

Since the cryptographic module 262 of the key generator 260 now knows Y, Z and y, it can calculate an encryption key $Y^*=Z^y$ mod n.

In step 286 of the process, the encryption key Y* is used by the encryptor 266 to encrypt the configuration data, and this is passed to the devices 220, 240.

Since the cryptographic modules 230, 250 of the devices 220, 240 have access to the respective identifiers w and x and their common public key Z, as well as the public key Y of the key generator 260, they are able to calculate the required decryption key and, in step 288 of the process, the received encrypted data is decrypted. The decrypted data is the original configuration data, and can be used to configure the programmable logic 222, 242 of the devices 220, 240 as required.

As described above with reference to FIG. 5, the public key Y of the key generator 260 can be exchanged with the board 200 before the configuration data is encrypted, allowing the cryptographic modules 230, 250 of the devices 220, 240 to calculate the required decryption key, or alternatively the public key Y of the key generator 260 can be sent with the encrypted configuration data, allowing the cryptographic modules 230, 250 of the devices 220, 240 to calculate the required decryption key at that time.

The steps of this process can be performed in different orders, and at different times. For example, the two devices 220, 240 can communicate when they are first powered up to determine how many such devices are present, and to establish their common keys, or the common keys can be generated only when configuration is about to take place. The resulting common key can be stored in devices, or can be regenerated when it is required.

One of the devices can be designated as a master device for the process of generating and distributing the common keys, and communicating with the key generator 260, with the other devices acting as slaves. For example, the master device will in that case need to communicate with the other devices on the board and obtain their public keys, in order to be able to calculate a common public key, which it can then broadcast to the slave devices as well as to the server.

Alternatively, the devices can play equal roles in the generation and distribution of the common keys. In that case, a round robin method can be used to generate the common public key, with each of the devices on the board contributing its public key in turn.

There is therefore disclosed a method for enhancing the security of configuration data, and a device that allows for such enhanced security.

The invention claimed is:

1. A method of configuring an electronic device, the method comprising:
    reading, off the electronic device, first and second identifiers stored thereon, wherein the first identifier can be read off the electronic device only once, and wherein the electronic device can decrypt configuration data encrypted based at least in part on the first identifier;
    generating a first public key based on the first identifier;
    exchanging, with the electronic device, the first public key and a second public key using a key exchange protocol;
    generating an encryption key using the exchanged first public key and the second public key;
    providing, after said reading, said first and second identifiers for storage in a database such that, in response to said database thereafter receiving the second identifier, the configuration data is encrypted based on the encryption key and then applied to the electronic device, and
    transmitting the encrypted configuration data to the electronic device.

2. The method of claim 1, wherein the electronic device comprises a programmable logic device.

3. The method of claim 1, further comprising reading the second identifier off the electronic device at least a second time.

4. The method of claim 3, wherein the database is associated with a computer configured to encrypt the configuration data.

5. The method of claim 1, further comprising, in a computer separate from said programmable electronic device:
    generating a random number;
    receiving said first public key from said programmable electronic device; and
    forming the encryption key from said first public key and said random number.

6. The method of claim 5, further comprising generating the second public key from said random number.

7. The method of claim 6, further comprising transmitting said second public key to said programmable electronic device as a step in a public key exchange between said computer and said programmable electronic device.

8. The method of claim 6, further comprising transmitting said second public key to said programmable electronic device together with said encrypted configuration data.

9. A method of configuring an electronic product comprising a plurality of electronic devices, the method comprising:
providing each electronic device of said plurality of electronic devices with a respective first identifier, wherein the first identifiers cannot be read off the respective electronic devices;
generating a second identifier from the respective first identifier on each electronic device of said plurality of electronic devices as a respective public key;
generating from said respective public keys a common public key for said plurality of electronic devices by exchanging the respective public keys using a key exchange protocol;
calculating an encryption key using an arithmetic operation on the common public key;
encrypting configuration data with the encryption key;
applying the encrypted configuration data to the plurality of electronic devices; and
decrypting the encrypted configuration data in the plurality of electronic devices.

10. The method of claim 9, further comprising generating a common decryption key for said plurality of electronic devices.

11. The method of claim 9, wherein one electronic device of said plurality of electronic devices is operable to:
obtain the respective public key from each electronic device of said plurality of electronic devices;
generate said common public key; and
send said common public key to each electronic device of said plurality of electronic devices.

12. The method of claim 9, wherein said plurality of electronic devices cooperate in a round robin method to generate said common public key.

13. An electronic device, comprising:
programmable logic resources; and
an interface for receiving configuration data, wherein:
the electronic device has first and second identifiers stored thereon, such that said first identifier can be read off the electronic device only once, and such that said second identifier can be read off the electronic device; and
wherein encrypted configuration data received on said interface can be decrypted on the basis of said first identifier stored on the electronic device, wherein the encrypted configuration data is based at least in part on:
reading, off the electronic device, the first and second identifiers;
generating a first public key based on the first identifier;
exchanging, with the electronic device, the first public key and a second public key using a key exchange protocol;
generating an encryption key using the exchanged first public key and the second public key;
after reading said first and second identifiers off the electronic device, providing said first and second identifiers for storage in a database such that, in response to said database thereafter receiving the second identifier, the configuration data is encrypted based on the encryption key and then applied to the electronic device, and
transmitting the encrypted configuration data to the electronic device.

14. An electronic product comprising:
a plurality of electronic devices, wherein the plurality of electronic devices are coupled to each other, wherein each electronic device of the plurality of electronic devices comprises:
programmable logic resources;
an interface for receiving configuration data; and
cryptographic circuitry, wherein:
the electronic device has a first identifier stored thereon, such that said first identifier cannot be read off the electronic device;
the cryptographic circuitry is operable to generate a second identifier from said first identifier as a respective public key and to communicate, using a key exchange protocol, said respective public key to other cryptographic circuitries of said plurality of electronic devices;
the cryptographic circuitry is operable to receive said respective public keys from other cryptographic circuitries of said plurality of electronic devices and generate from said respective public keys a common public key for said plurality of electronic devices; and
configuration data received on said interface having been encrypted with an encryption key calculated using an arithmetic operation on said common public key.

15. The electronic product of claim 14, wherein the electronic device is operable to receive a public key from a remote server together with said encrypted configuration data, and is operable to generate a decryption key from said first identifier and said public key from said remote server.

16. The electronic product of claim 14, wherein the electronic device is operable to receive a public key from a remote server as part of a key exchange including sending the common public key to said remote server, and is operable to generate a decryption key from said first identifier and said public key from said remote server.

17. The method of claim 1, further comprising: configuring the electronic device using the decrypted configuration data.

18. The method of claim 3, wherein after the first identifier has been read off the electronic device one time, a fuse is blown such that the first identifier cannot thereafter be read off the electronic device.

19. The method of claim 9, further comprising: configuring the plurality of electronic devices using the decrypted configuration data.

* * * * *